United States Patent [19]

Hashimoto et al.

[11] 4,074,425
[45] Feb. 21, 1978

[54] APPARATUS FOR AUTOMATICALLY FEEDING AND SETTING STUD BOLTS

[75] Inventors: Hiroshi Hashimoto; Tetsuo Abe; Akira Kato, all of Aichi, Japan

[73] Assignee: Sanyo Machine Works, Ltd., Japan

[21] Appl. No.: 779,836

[22] Filed: Mar. 21, 1977

[30] Foreign Application Priority Data

Mar. 19, 1976 Japan .................................. 51-30282
Oct. 23, 1976 Japan ......................... 51-142849[U]

[51] Int. Cl.² ...................... B23P 19/06; B25B 23/04
[52] U.S. Cl. ..................................... 29/813; 221/171; 81/53.2; 144/32 S
[58] Field of Search ..................... 29/813, 240; 144/32; 81/53.2; 221/172, 171

[56] References Cited

U.S. PATENT DOCUMENTS 3,533,534  10/1970  Gaydon .................................. 221/171
3,563,361   2/1971  Piroutek ............................. 29/240 X Primary Examiner—Milton S. Mehr
Attorney, Agent, or Firm—Hall & Houghton

[57] ABSTRACT

An apparatus for automatically feeding and setting stud bolts. The apparatus comprises a parts feeder unit for axially arranging stud bolts having threaded portions of different lengths on the opposite ends thereof in a low, a bolt orienting unit for directing stud bolts in one direction, an escapement unit for correctly feeding stud bolts one by one, an impact wrench unit for screwing stud bolts into intended work to set them in position, a pneumatic pressure control unit for feeding compressed air produced by a compressor into the escapement unit and impact wrench unit, and an electric control unit for electrically controlling the units, the arrangement being such that all operations which end up with screwing stud bolts into intended work to set them in position are carried out mechanically.

2 Claims, 14 Drawing Figures

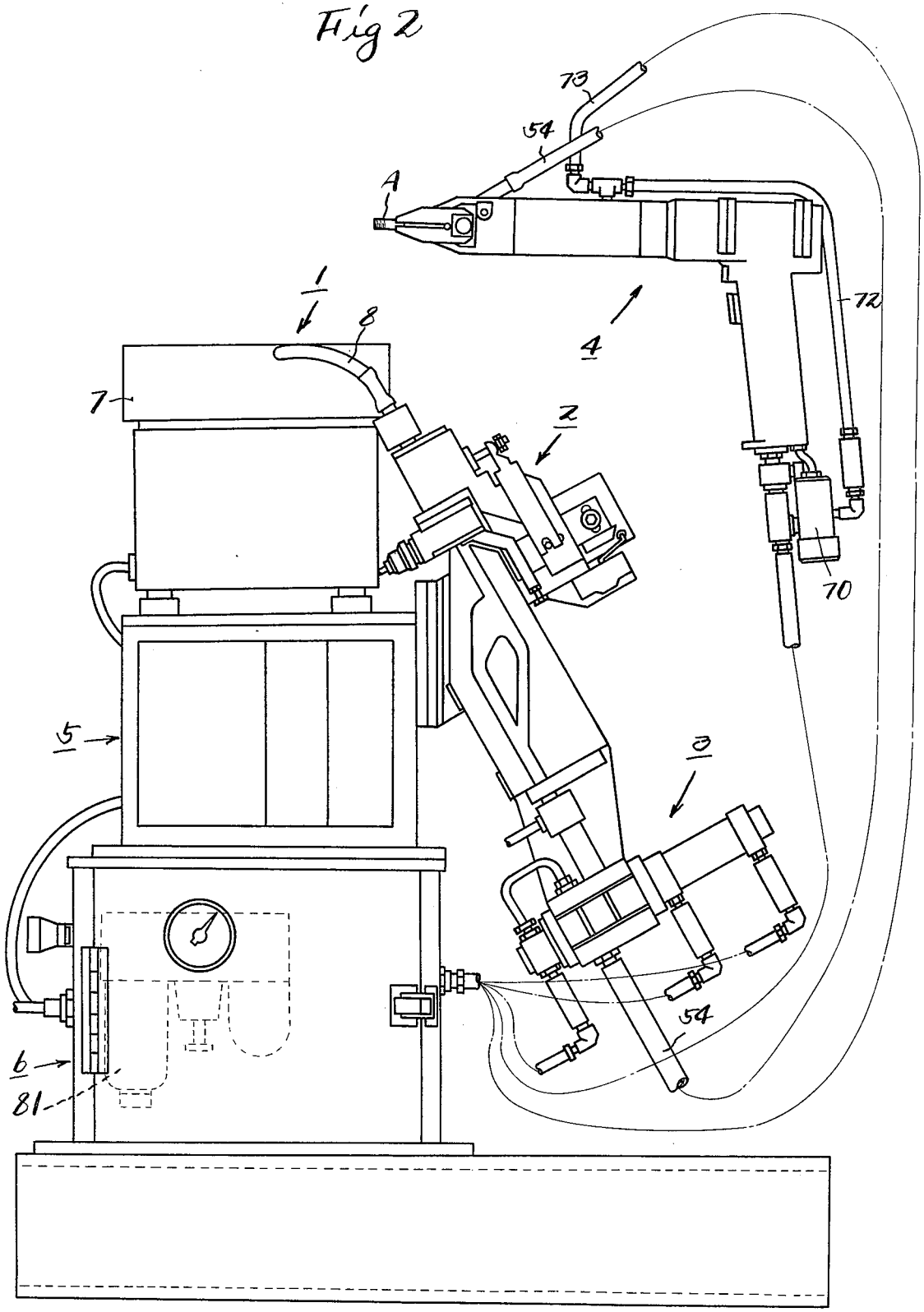

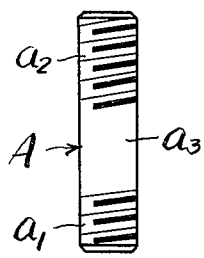
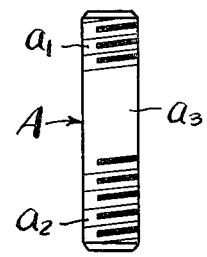
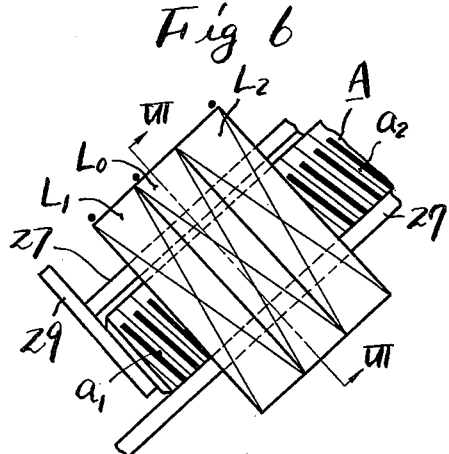
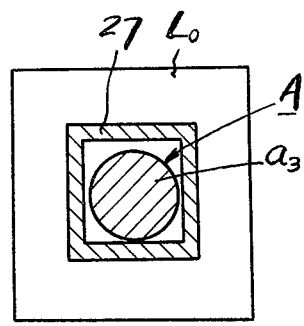
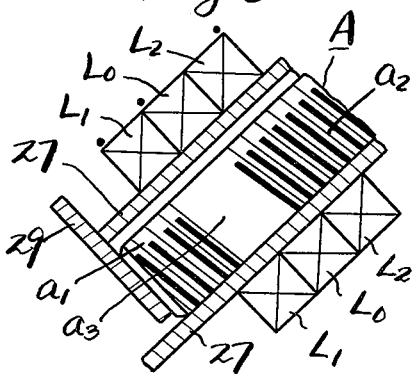
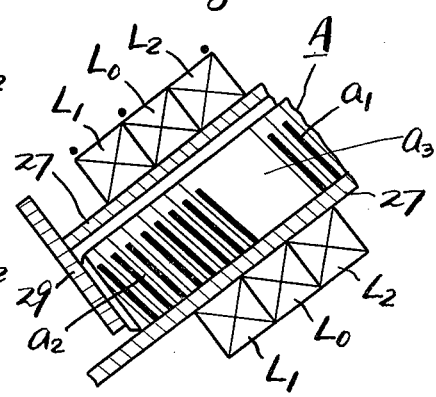
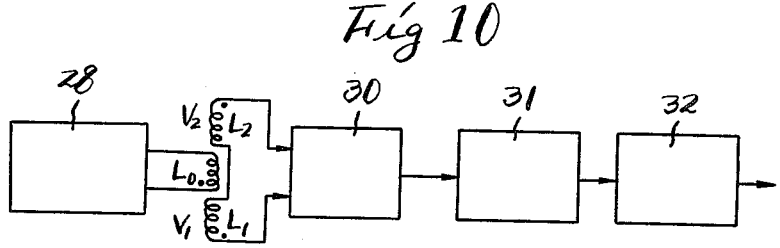

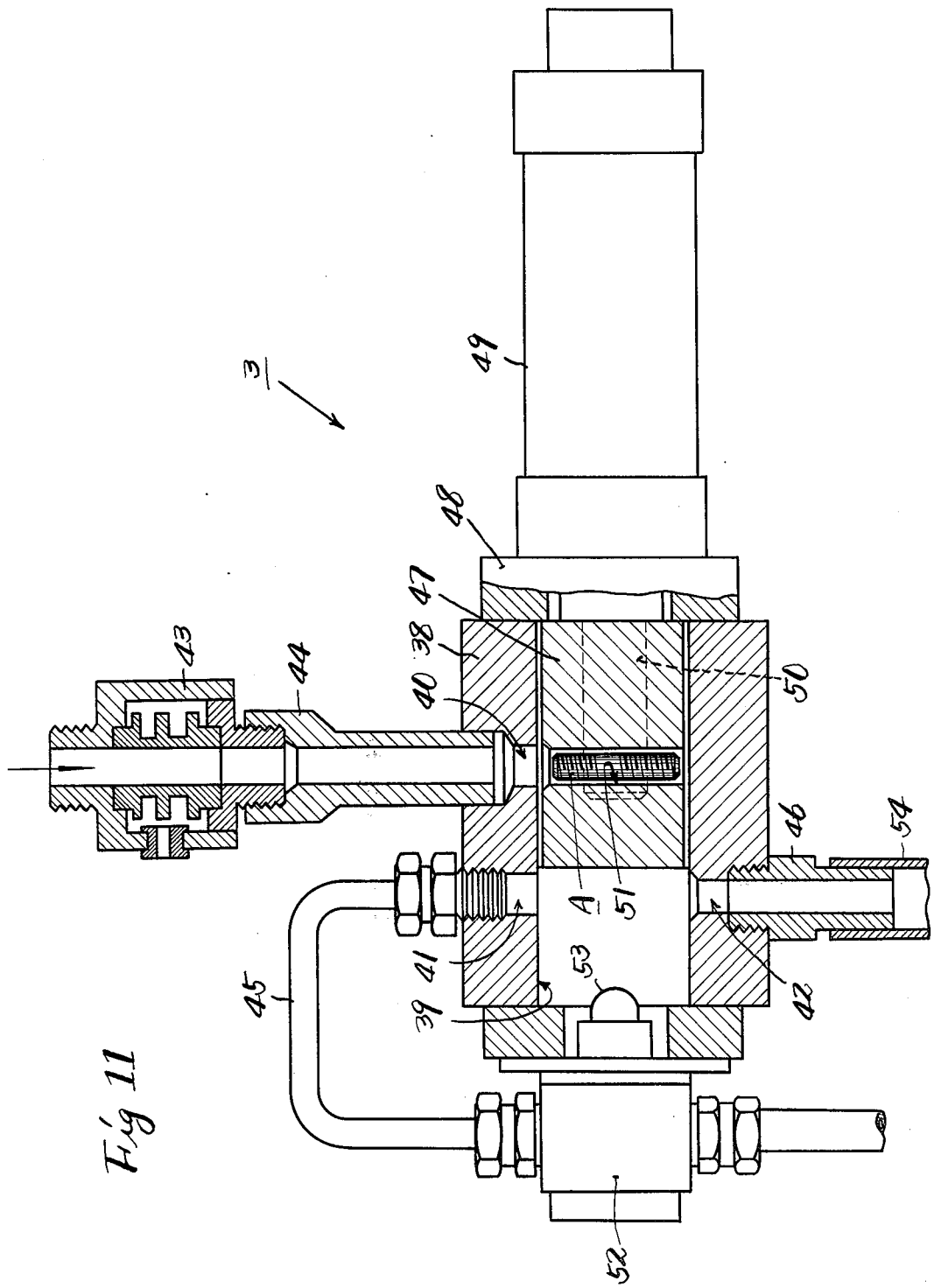

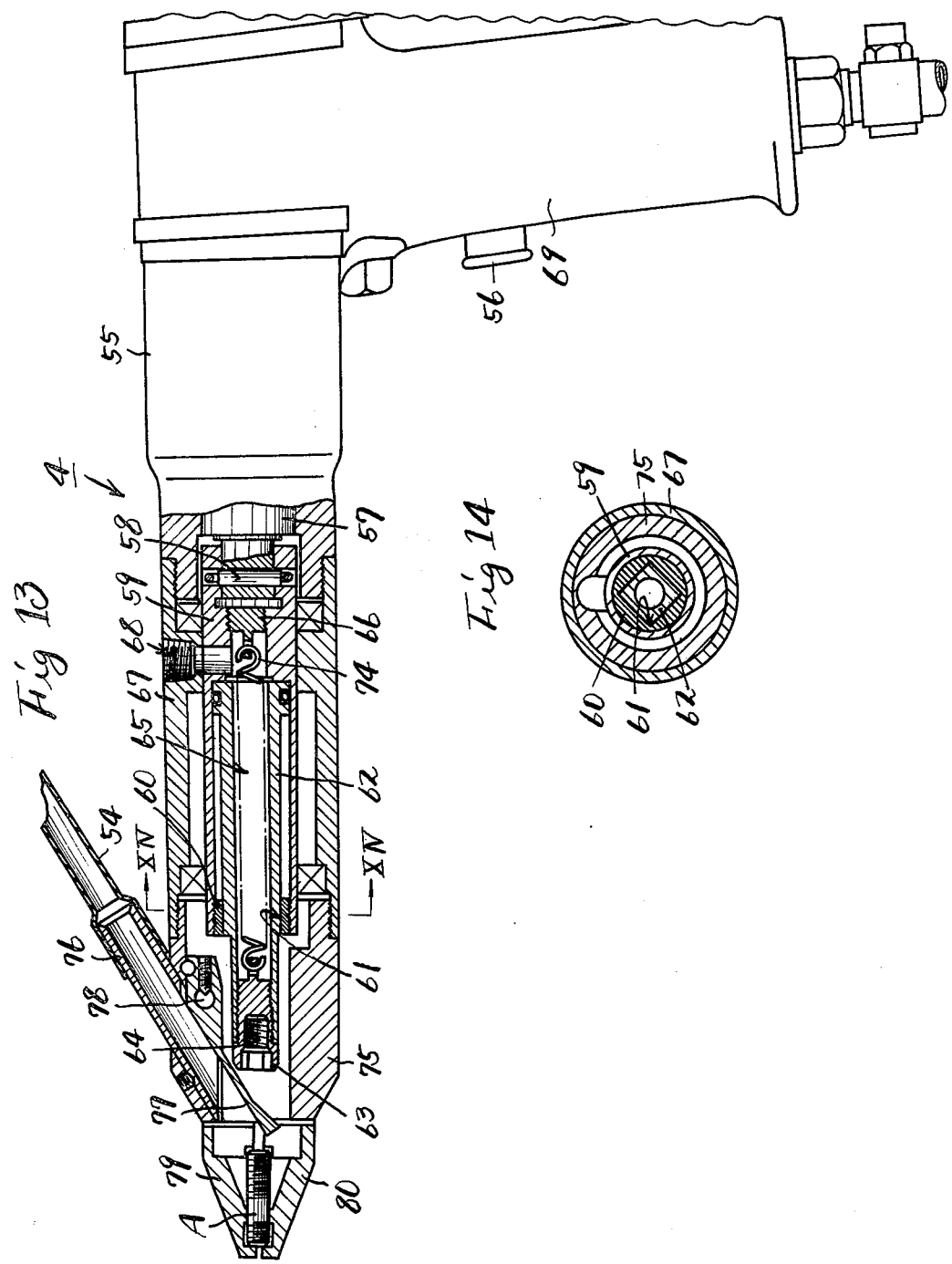

APPARATUS FOR AUTOMATICALLY FEEDING AND SETTING STUD BOLTS

BRIEF DESCRIPTION OF THE INVENTION (a) Field of the Invention

The present invention relates to an apparatus for automatically feeding and setting stud bolts, whereby bolts comprising round bars threaded from the opposite ends thereof, i.e., stud bolts, are automatically oriented and correctly fed one by one and they are finally screwed into intended work to be set in position.

(b) Description of the Prior Art

Heretofore, there has not been provided any apparatus of the type adapted to automatically feed stud bolts and screw them into intended work to set them in position. There are two reasons for the lack of such apparatus: One reason is that in most cases, as shown in FIG. 1, the threaded portions $a1$, $a1$ of such stud A used for fitting parts together differ in length, so that, under the present condition, the stud bolts A can only be axially arranged as by a parts feeder but it is impossible to orient them. The other reason is that there is no mechanism available which is capable of correctly feeding stud bolts A automatically one by one into an impact wrench, thus making it necessary to feed stud bolts A twice. Therefore, conventionally, the operator ascertains the direction of stud bolts A and then manually feed them one by one into an impact wrench. Thus, this operation has the disadvantages of requiring much time and labor and of being incapable of quickly and efficiently carrying out bolt setting operation.

SUMMARY OF THE INVENTION

With these circumstances in the conventional operation for setting stud bolts taken into consideration, the present invention provides an apparatus for automatically feeding and setting stud bolts comprising a parts feeder unit including a parts feeder whereby a number of randomly charged stud bolts are arranged in a row and delivered; a bolt orienting unit including a reversing plate placed in the vicinity of the passageway of stud bolts and adapted to be projected and retracted in response to a detection signal from a direction detector for detecting the direction of stud bolts, whereby when a stud bolt is detected by said direction detector, if the stud bolt is found to have a forward direction it is allowed to pass with its direction maintained but if it is found to have a backward direction the reversing plate is projected in response to a detection signal from said direction detector to reverse the direction of the stud bolt and allow the latter to pass with its direction thus reversed, thereby assuring that when stud bolts are to be delivered their direction is always oriented; an escapement unit including a block which has a through-hole adapted to receive an axially directed stud bolt and which is slidably disposed in the guide hole of a housing so as to be reciprocated by the extension and retraction of the piston rod of an air cylinder, and a mechanical valve disposed at an end of the housing and having its operating portion projecting into the guide hole so that when the block is advanced its leading end actuates the mechanical valve to feed compressed air into the through-hole so as to forcibly deliver the stud bolt received in the through-hole; an impact wrench unit including a socket having an internally threaded portion engageable with the threaded portions of stud bolts, said socket being threadedly fitted in the front end of a piston which is inserted in the square hole of a block fixed to a cylinder barrel integrally joined to a pneumatically operable driving device so that said piston is slidable relative to the cylinder barrel and the rotation of the cylinder barrel can be transmitted thereto, and a selfholding valve adapted to be manually reset to stop the driving of said driving device and cut off the air being fed into the piston chamber for said piston and simultaneously feed air to the air cylinder of said escapement unit, so that said impact wrench unit is reliably fed with stud bolts one by one from said escapement unit and upon feeding of a stud bolt the driving device is driven while air is fed into the piston chamber so that the socket is rotated while being advanced to screw the stud bolt into intended work; a pneumatic pressure control unit for feeding compressed air produced by a compressor to said escapement unit and said impact wrench unit; and an electric control unit for driving and controlling said parts feeder of said parts feeder unit, said direction detector of said bolt orienting unit and said compressor of said pneumatic pressure control unit. Thus, the invention is characterized in that it makes possible the automatic feeding of stud bolts which has heretofore been considered impossible, thereby saving the time and labor involved in feeding stud bolts and that all operations which end up with screwing stud bolts into intended work to set them in position are automatically, quickly and efficiently carried out.

BRIEF DESCRIPTION OF THE INVENTION

FIG. 2 is a schematic view of an entire apparatus for automatically feeding and setting stud bolts constructed according to an embodiment of the invention;

Figure 1:
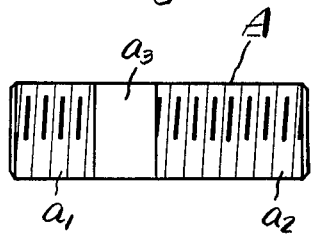
FIG. 1 is a side view of a stud bolt handled in the present invention.
Figure 3:
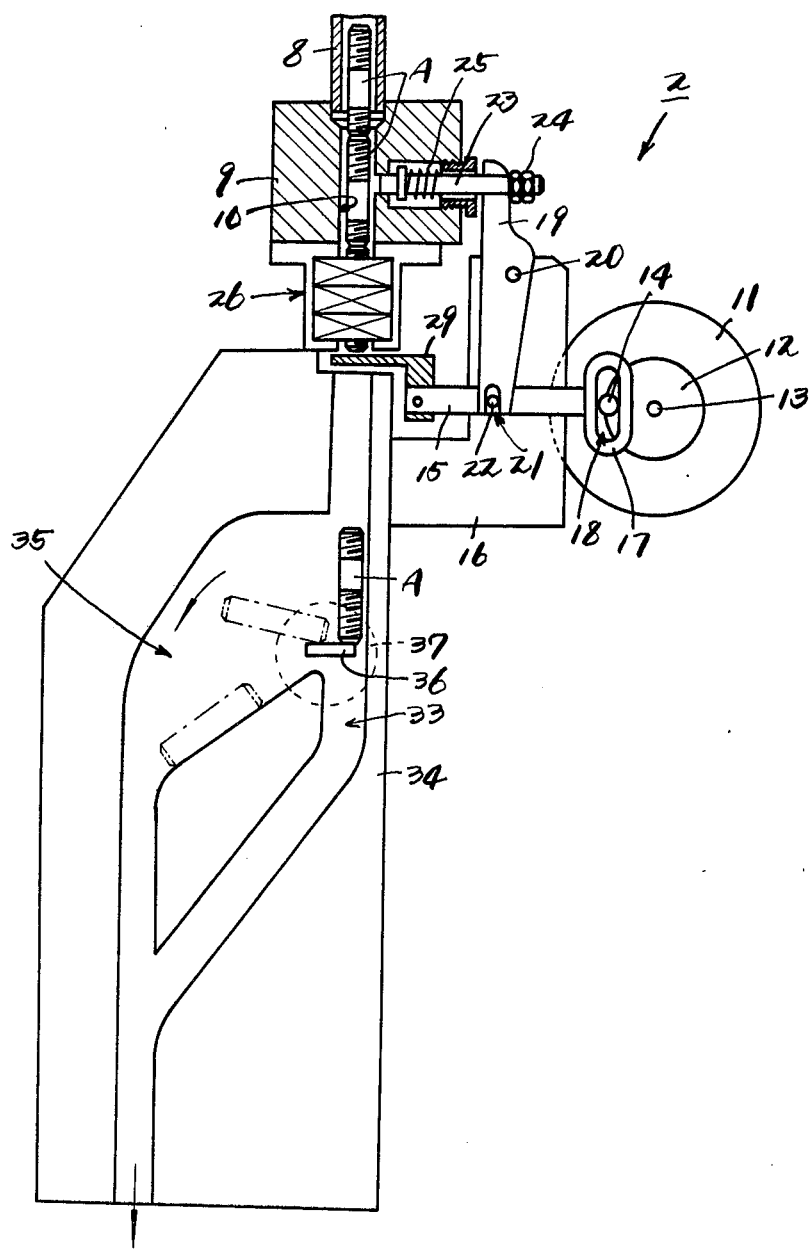
Figure 12:
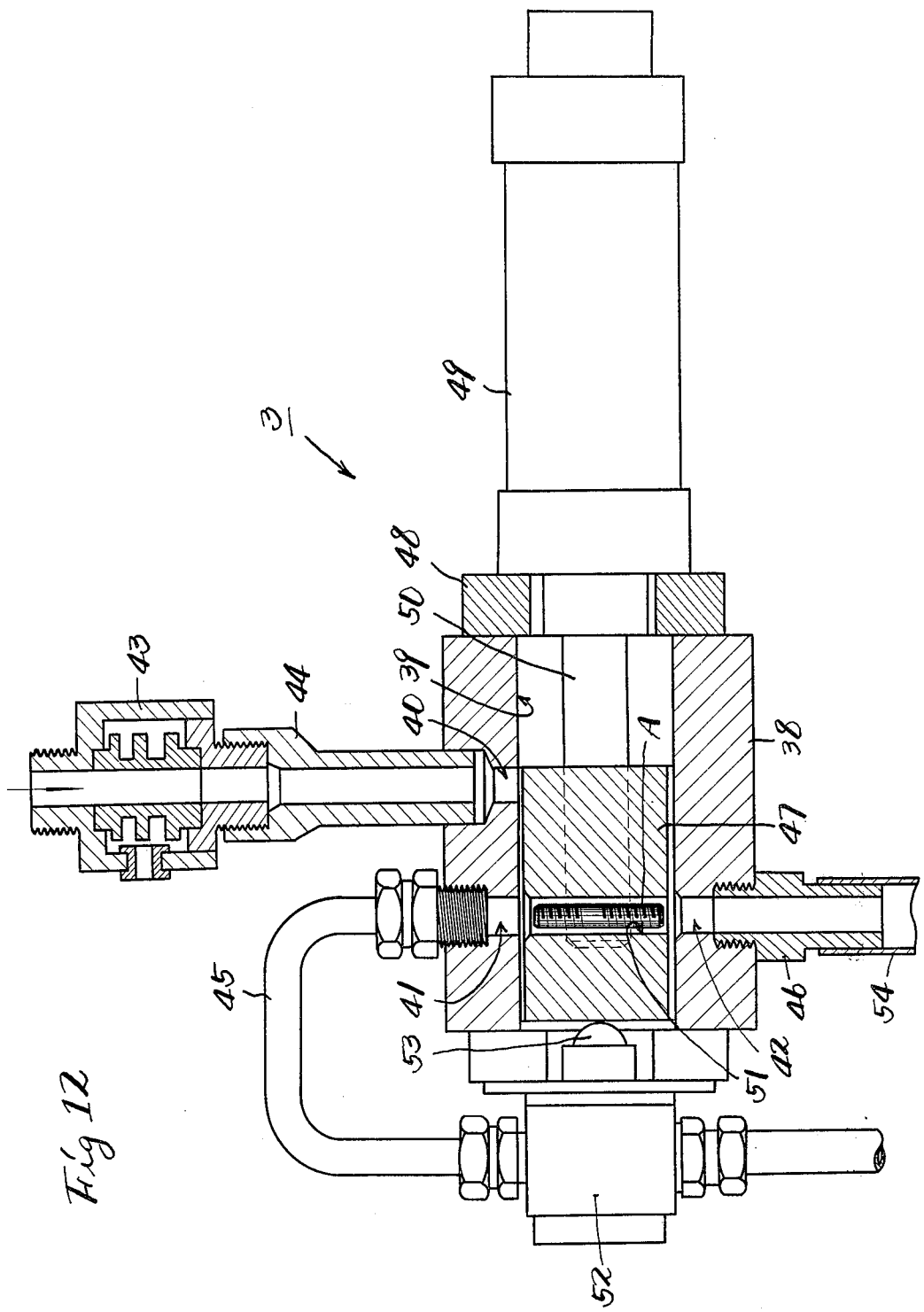

FIGS. 3 through 10 show the details of a stud bolt orienting unit, wherein FIG. 3 is a schematic view of said bolt orienting unit shown in its entirety, FIGS. 4 and 5 are explanatory views showing forwardly and backwardly directed stud bolts, respectively, FIG. 6 is a side view in longitudinal section of a direction detector, FIG. 7 is a section taken along the line VII—VII of FIG. 6, FIGS. 8 and 9 are explanatory views showing stud bolts assuming a forward and a backward direction, respectively, when brought to a halt at a fixed position in a bobbin, and FIG. 10 is a block diagram of the voltage difference detecting section of the direction detector;

FIGS. 11 and 12 show the details of an escapement unit, wherein FIG. 11 is a side view in longitudinal section of an air cylinder in its retracted position and FIG. 12 is a side view in longitudinal section of said air cylinder in its extended position; and FIGS. 13 and 14 show the details of an impact wrench unit, wherein FIG. 13 is a side view partly in longitudinal section of the impact wrench unit and FIG. 14 is a section taken along the line XIV—XIV of FIG. 13.

DESCRIPTION OF THE PREFERRED EMBODIMENT

An apparatus for automatically feeding and setting stud bolts constructed according to the present invention comprises a parts feeder unit 1, a bolt orienting unit 2, an escapement unit 3, an impact wrench unit 4, an electric control unit 5 and a pneumatic pressure control unit 6.

The parts feeder unit 1 is a unit where stud bolts A are arranged in order, and it employs a conventional parts feeder 7 whereby stud bolts A randomly charged thereinto are axially arranged in a row and delivered. In addition, 8 designates a chute having its front end connected to the delivery region of the parts feeder 7 and its base connected to a bolt orienting unit 2. Thus, the chute has the function of a sliding platform allowing the stud bolts A delivered from the parts feeder 7 to be successively delivered to the bolt orienting unit 2 in the orderly arranged condition.

The bolt orienting unit 2 causes stud bolts A which are orderly arranged and delivered by the parts feeder 7 to point to one direction, and is construction will now be described.

In FIG. 3, the numeral 9 designates a plate connected to the chute 8 and having a guide groove 10 to which stud bolts A orderly arranged by said parts feeder 7 are successively delivered in a line. The numeral 11 designates a motor and 12 designates a crank disc fixed on the rotative shaft 13 of the motor 11 and having a crank pin 14 projecting from the surface thereof. A rod 15 slidably mounted on a plate 16 has a member 17 fixed to one end thereof, said member 17 having an elongated hole 18 in which said crank pin 14 is received to connect the rod 15 to the crank disc 12, so that the rod is linearly reciprocated as the crank disc 12 is rotated. An arm 19 pivotally mounted on the plate 16 through a pivot shaft 20 has a notch 21 at one end thereof receiving a pin 22 projecting from the middle region of the rod 15 so as to connect the arm to the rod, so that the arm swings around the axis of the pivot shaft 20 as the rod 15 is linearly reciprocated. A rod 23 slidably mounted in the plate 9 is connected at its one end to the arm 19 by nuts 24, so that it is linearly reciprocated as the arm 19 swings. The rod 23 carries a spring 25 compressed between it and the plate 9, said spring causing the front end of the rod 23 to project into the guide groove 10 of the plate 9 and bear against a stud bolt A received in said guide groove so as to prevent said stud bolt from sliding downward. Designated at 26 is a direction detector disposed below the plate 9. It detects the direction of a stud bolt A received therein and produces a signal as an output.

The construction of said direction detector 26 is as shown in FIGS. 4 through 10. First of all, assume that the direction of a stud bolt A is forward when it is as shown in FIG. 4 and backward when it is as shown in FIG. 5. A bobbin 27 has three coils L1, L0 and L2 disposed therearound and positioned so as to allow stud bolts A to pass through the interior thereof. The winding directions of the end coils L1 and L2 are opposite to each other. In addition, the dots on the coils indicate the winding directions. Designated at 28 is an oscillator which oscillates in response to periodic changes in voltage and produces an output voltage having, for example, a sine waveform or square waveform. This oscillator 28 is connected to the central coil L0. A stop 29 is fixed to the front end of the rod 15 and slidably disposed in the passageway of the bobbin 27 to stop a stud bolt A at a predetermined position in the bobbin 27. More particularly, the disposition of the stop is such that when a stud bolt A comes flowing down in the forwardly directed condition shown in FIG. 8, its plain portion $a3$ lies across the coils L1 and L0. Since there is a slight difference in configuration between the plain portion $a3$ and threaded portions $a1$, $a2$, there will be produced a difference in permeability. If, therefore, a stud bolt A which abuts against the stop 29 has the forward direction, the plain portion $a3$ lies across the coils L1 and L0. In this case, the voltage differential V1 − V2 is a positive value, where V1 is the voltage produced across the coil L1 and V2 across the coil L2. Further, if the stud bolt A is backwardly directed, its plain portion $a3$ lies across the coils L0 and L3, so that the voltage differential V1 − V2 is a negative value. A detecting device is connected to the end coils L1 and L2 through an integrator 30, an amplifier 31 and a control 32 to detect the direction of the stud bolt A and produce a corresponding signal or output.

Designated at 33 is a guide groove formed in a plate 34 installed under said direction detector 26. The guide groove communicates at its upper region with the passageway of the bobbin 27 and its lower region with the escapement unit 3, and a reversing space 35 for stud bolts A is provided between said regions. Designated at 36 is a reversing plate adapted to be inserted into and retracted from the reversing space 35 of the guide groove 33 by an electromagnet 37 in response to a signal or output from the detecting device of said direction detector 26.

The escapement unit 3 is a unit whereby stud bolts A being fed in an oriented by said bolt orienting unit 2 are fed correctly one by one into the impact wrench unit 4 in timed relation to the latter, and its construction is as follows.

In FIGS. 11 and 12, the numeral 38 designates a housing; 39, a guide hole formed in the housing 38; and the numerals 40, 41 and 42 designate passageways formed in the housing 38 so as to open to the guide hole 39. The passageway 40 has connecting members 43 and 44 connected to the upper, inlet end thereof to communicate with the guide groove 33 of the plate 34 in the bolt orienting unit 2; the passageway 41 has an air pipe 45 connected to the upper, inlet end thereof, said air pipe communicating with the pneumatic pressure control unit 6 as an air source; and the passageway 42 has a connecting member 46 connected to the lower, outlet end thereof to communicate with the impact wrench unit 4. Designated at 47 is a block reciprocably fitted in the guide hole 39 of the housing 38. It is secured to the front end of the piston rod 50 of a cylinder 49 installed on the right-hand end of the housing through a spacer 48, so that it is reciprocated as the piston rod 50 is extended and retracted. A through-hole 51 formed in the block 47 will communicate with the passageway 40 when moved to the right-hand end of the guide hole 39 of the housing 38 upon contraction of the piston rod 50 of the cylinder 49, as shown in FIG. 11, and it will communicate with the passageways 41 and 42 when moved to the left-hand end of the guide hole 39 of the housing 38 upon extension of the piston rod 50 of the cylinder 49, as shown in FIG. 12. A mechanical valve 52 placed in the air pipe 45 for admitting and cutting off compressed air to be fed to the passageway 41 of the housing 38 has its operating portion 53 projecting into the left-hand end of the guide hole 39 of the housing 38. The mechanical valve 52 is arranged so that upon retraction of the piston rod 50 of the cylinder 49 moving the block 47 to the right-hand end of the guide hole 39 of the housing 38, it is closed to stop the supply of compressed air to the passageway 41 but that upon extension of the piston rod 50 of the cylinder 49 moving the block 47 to the left-hand end of the guide hole 39 of the housing 38 to push the operating portion 53, it is opened to allow compressed air from the pneumatic control unit 6 to be fed to the passageway 41. In addition, 54 designates a stud bolt feed pipe which connects the escapement unit 3 to the impact wrench unit 4.

The impact wrench unit 4 is a unit whereby stud bolts A being fed in one by said escapement unit 3 are screwed into intended work, and the construction thereof is as follows.

In FIGS. 13 and 14, the numeral 55 designates a driving device; 56, a drive button for the driving device 55; and the numeral 57 designates the driving shaft of the driving device 55, having the rear end of a cylinder barrel joined to the front end thereof through a pin 58. Designated at 60 is a block threadedly mounted in the front end of the cylinder barrel 59 and having a square hole 61 centrally formed therein. A square piston 62 is installed in the square hole 61 of the block 60 in such a manner that it is slidable axially of the cylinder barrel 59 and can transmit rotational torque from the cylinder barrel 59. Designated at 63 is a socket having an internally threaded portion 64 engageable with the threaded portions $a1$ and $a2$ of stud bolts A, and it is threadedly mounted in the front end of the piston 62. Designated at 65 is a piston chamber extending through the piston 62 and having the socket 63 threadedly fitted in the front end thereof as described above, and it is defined by threadedly fitting a cover 66 in the rear end of the cylinder barrel 59. A casing 67 is provided with a port 68 communicating with the piston chamber and pipes 71, 72 and 73 are installed so that compressed air from the pneumatic control unit 6 may be fed to the piston chamber 65 through a self-holding valve 70 connected to the lower end of a handle 69, as shown in FIG. 2. Designated at 74 is a spring stretched between the socket 63 and the cover 66, constantly pulling the piston 62 to the right relative to the cylinder barrel. Designated at 75 is an outer casing threadedly mounted in the front end of the casing 67, and it is provided with an introducing pipe 76 at the front end thereof and connected to the escapement unit 3 by the stud bolt feed pipe 54. A bolt guide 77 disposed in the lower region of the introducing pipe 76 is pivotally mounted on the outer casing 75 so as to be swingable around the axis of a pin 78. Designated at 79 and 80 are dogs installed at the front end of the outer casing 75, and they are pivotally mounted so as to be swingable around the axes of pins, though not shown.

The electric control unit 5 is a unit for driving the parts feeder 7 of the parts feeder unit 1 and the compressor 81 of the pneumatic control unit 6 and for controlling the direction detector 26 of the bolt orienting unit 2.

The pneumatic pressure control unit 6 is a unit for feeding compressed air produced by the compressor 81 into the escapement unit 3 and impact wrench unit 4.

All the mechanisms of the apparatus for automatically feeding and setting stud bolts according to the present invention have been described so far, and their operation will now be described.

First of all, a number of stud bolts A randomly charged into the parts feeder 7 are arranged in a row by the action of the parts feeder 7. The stud bolts A thus arranged in a row by the parts feeder 7 are successively delivered through the chute 8 to the bolt orienting unit 2. A stud bolt A which has been thus delivered to the bolt orienting unit 2 enters the direction detector 26 through the guide groove 10. The stud bolt A is then axially fed to the bobbin 27 and stopped at a predetermined position in the bobbin 27 by the stop 29. At this time if the stud bolt A is forwardly directed as shown in FIG. 8, the plain portion $a3$ lies across the coils L1 and L0, so that the voltage differential $V1 - V2$ between the end coils L1 and L2 is positive, but if the stud bolt A is backwardly directed, the plain portion $a3$ lies across the coils L0 and L2, so that the voltage differential $V1 - V2$ between the end coils L1 and L2 is negative. According to whether the voltage differential $V1 - V2$ is positive or negative, the direction of the stud bolt A is detected. When the direction of the stud bolt A is thus detected by the direction detector 26, the motor 11 is driven. When the crank disc 12 fixed to the rotative shaft 13 of the motor 11 is rotated through half a revolution, the crank pin 14 and the member 17 cooperate with each other to cause the rod 15 to slide to the right as viewed in FIG. 3 while the pin 23 on the middle region of the rod 15 causes the arm 19 to swing around the axis of the pivot shaft 20, causing the rod 23 locked to the arm 19 by the nuts 24 to slide to the left as viewed in the figure until its front end projects into the guide groove 10 of the plate 9 and abuts against the stud bolt A positioned next to the stud bolt A inside the direction detector 26 so as to prevent it from sliding downward. Simultaneously therewith, the stop 29 fixed to the front end of the rod 15 is opened to allow the stud bolt A inside the direction detector 26 to fall downward. When the crank disc 12 is rotated through another half revolution, i.e., one complete revolution as measured from the start, by further driving the motor 11, the rod 15 is slid to left through the crank pin 14 and member 17 to close the stop 29 fixed to the front end of the rod 15, and simultaneously therewith the pin 22 on the middle region of the rod 15 causes the arm 19 to swing around the axis of the pivot shaft 20, causing the rod 23 locked to the arm 19 by the nuts 24 to slide to the right as viewed in the figure to relieve the stud bolt A of the pressure exerted by the front end of the rod 23 so as to allow said stud bolt to fall downward into the direction detector 26. Thereafter, the detection of the direction of stud bolts is repeatedly carried out in the manner described above. If the stud bolt A is found to have the forward direction when detected by the detector 26, the electromagnet remains deenergized and hence the reversing plate 26 does not project, and in this condition since the stop 29 is opened the stud bolt A falls downward from the direction detector 26, sliding along the guide groove 33 of the plate 34 until it reaches the exit while maintaining its direction because of the absence of the reversing plate 36. If the stud bolt A is found to have the backward direction when detected by the detector 26, the signal or output from the direction detector 26 causes the energization of the electromagnet 37, thus projecting the reversing plate 36. In this condition since the stop 29 is opened, the stud bolt A, when falling downward from the direction detector 26, slides along the guide groove 33 of the plate 34 and strikes the reversing plate 36 and is thereby reversed in the reversing space 35 as shown in phantom lines and falls downward to the exit. In this manner by detecting the direction of the stud bolt A by the direction detector 26, the reversing plate 36 is projected only when the stud bolt is found to be backwardly directed, causing the stud bolt to be reversed. Thus, it is not until the stud bolt A is oriented that it is fed into the escapement unit 3.

The stud bolt A oriented by the bolt orienting unit 2 and fed into the escapement unit 3 in the manner described above enters the passageway 40 through the connecting members 43 and 44 and is fed into the through-hole 51 of the block 47 communicating with said passageway, as shown in FIG. 11. When the stud bolt A is fed into the through-hole 51 of the block 47, the piston rod 50 of the air cylinder 49 is extended in timed relation to the impact wrench 4, so that the block 47 slides inside the guide hole 39 to the left as viewed in the figure until it reaches the left-hand end of the housing 38. Upon such movement of the block 47 the condition shown in FIG. 12 is established wherein communication is established between the through-hole 51 and the passageways 41 and 42 and the operating portion 53 of the mechanical valve 52 is pushed by the left-hand end of the block 52. As a result, the mechanical valve 52 is opened to allow compressed air from the pneumatic control unit 6 to be fed in through the air pipe 45, so that the stud bolt A inside the through-hole 51 of the block 47 is fed under pressure from the passageway 42 via the connecting member 46 and stud bolt feed pipe 54 into the impact wrench unit 4. Upon feeding of the stud bolt A to the impact wrench unit 4, the piston rod 50 of the air cylinder 49 is retracted, causing the block 47 to slide inside the guide hole 39 to the right as viewed in the figure until it reaches the left-hand end of the housing 38 where its through-hole 51 communicates with the passageway 40. Then the left-hand end of the block 47 ceases to push the operating portion 53 of the mechanical valve 52, so that the mechanical valve is closed to cut off the supply of compressed air to the passageway 41 of the housing 38. Thereafter the operations described above are repeated, feeding stud bolts A one by one to the impact wrench unit 4 in timed relation to the latter.

The stud bolt A fed from the escapement unit 3 via the stud bolt feed pipe 54 into the impact wrench unit 4 is introduced into the introducing pipe 76 and then guided to the dogs 79 and 80 by the bolt guide 77, whereupon the dogs grip the stud bolt to complete the feeding operation. When the operator ascertains the completion of the feeding of the stud bolt A, he pushes the drive button 56 for the driving device 55 to drive the latter and hence the output shaft 57 is rotated, whereupon the cylinder barrel 59 integrally connected to the output shaft 57 through the pin 58 is rotated along with the piston 62 inserted in the square hole 61 of the block 60 threadedly mounted in the front end of said cylinder barrel 59. Further, when the drive button 56 for the driving device 55 is pushed, the self-holding valve 70, which has received a pilot signal with compressed air from the pneumatic control unit 6 used as a signal source, is actuated to feed compressed air from the pneumatic control unit 6 to the port 68. The compressed air thus fed to the port 68 is introduced into the piston chamber 65 communicating with said port 68, forwardly moving the piston 62 to the left as viewed in the figure against the force of the spring 74. In addition, the piston 62 will not be retracted unless the self-holding valve 70 is manually reset. Therefore, under the action of the piston 62, the socket 63, while rotating, strikes the stud bolt A retained by the dogs 79 and 80 and the threaded portion a1 is screwed into the internally threaded portion 64 of the socket 63 and the stud bolt A is rotated. At this time, the forward movement of the socket 63 causes the bolt guide 77 to swing upwardly around the axis of the pin 78 to clear the socket while the dogs 79 and 80 also swing apart from each other to allow the threaded portion a2 of the stud bolt A to project outward beyond the dogs 79 and 80 by a suitable amount to be ready for being set. In this condition if brought to a threaded hole in intended work, the threaded portion a2 of the stud bolt a is screwed into said threaded hole. When the operator ascertains the completion of the setting of the stud bolt A in the intended work, he pulls the impact wrench unit 4 away from the stud bolt A, whereupon a switching valve (not shown) contained in the driving device 55 is actuated to cause the output shaft 57 to be rotated in the opposite direction. As a result, through the output shaft 57, cylinder barrel 59, block 60 and piston 62, the socket 63 is rotated in the reverse direction and hence separated from the stud bolt A. The operator, who has ascertained the separation of the socket 63 from the stud bolt A, then manually resets the self-holding valve 70 in order to carry out the next operation, i.e., to feed a fresh stud bolt A. Upon resetting of the self-holding valve 70, the supply of compressed air from the pneumatic control unit 6 to the port 68 is cut off and the piston 62 is retracted to the right as viewed in the figure to resume the original condition shown in FIG. 13 under the action of the spring 74. As soon as said manual resetting is carried out, compressed air from the pneumatic control unit 6 is delivered to the air cylinder 49 of the escapement unit 3, whereby a stud bolt A is fed from the escapement unit 3 via the stud bolt feed pipe 54 into the impact wrench unit 4. Thereafter, a timer (not shown), which is set to a sufficient period of time for the stud bolt A to be fed to the dogs 79 and 80 of the impact wrench unit 4 and gripped thereby, is actuated, whereby the piston rod 50 of the air cylinder 49 in the impact wrench unit 4 is retracted to wait for new instructions and simultaneously the bolt feeding compressed air is also cut off by the mechnanical valve 52 and waits for the next operation, i.e., the operation of the operator pushing the drive button 56 for the driving device 55 in the impact wrench.

As has been described so far, the present invention makes possible the automatic feeding of stud bolts which has heretofore been impossible. Thus, all the operations which begin with orienting stud bolts and feeding them correctly one by one and end up with screwing them into intended work can be carried out automatically, quickly and efficiently, thus saving the time and labor heretofore involved in such operations.

Whiles there have been described herein what are at present considered preferred embodiments of the several features of the invention, it will be obvious to those skilled in the art that modifications and changes may be made without departing from the essence of the invention.

It is therefore to be understood that the exemplary embodiments thereof are illustrative and not restrictive of the invention, the scope of which is defined in the appended claims and that all modifications that come within the meaning and range of equivalency of the claims are intended to be included therein.

We claim:

1. An apparatus for automatically feeding and setting stud bolts comprising a parts feeder unit including a parts feeder whereby a number of randomly charged stud bolts are arranged in a row and delivered; a bolt orienting unit including a reversing plate placed in the vicinity of the passageway of stud bolts and adapted to be projected and retracted in response to a detection signal from a direction detector for detecting the direction of stud bolts, whereby when a stud bolt is detected by said direction detector, if the stud bolt is found to have a forward direction it is allowed to pass with its direction maintained but if it is found to have a backward direction the reversing plate is projected in response to a detection signal from said direction detector to reverse the direction of the stud bolt and allow the latter to pass with its direction thus reversed, thereby assuring that when stud bolts are to be delivered their direction is always oriented; an escapement unit including a block which has a through-hole adapted to receive an axially directed stud bolt and which is slidably disposed in the guide hole of a housing so as to be reciprocated by the extension and retraction of the piston rod of an air cylinder, and a mechanical valve disposed at an end of the housing and having its operating portion projecting into the guige hole so that when the block is advanced its leading end actuates the mechanical valve to feed compressed air into the through-hole so as to forcibly deliver the stud bolt received in the through-hole; an impact wrench unit including a socket having an internally threaded portion engageable with the threaded portions of stud bolts, said socket being threadedly fitted in the front end of a piston which is inserted in the square hole of a block fixed to a cylinder barrel integrally joined to a pneumatically operable driving device so that said piston is slidable relative to the cylinder barrel and the rotation of the cylinder barrel can be transmitted thereto, and a self-holding valve adapted to be manually reset to stop the driving of said driving device and cut off the air being fed into the piston chamber for said piston and simultaneously feed air to the air cylinder of said escapement unit, so that said impact wrench unit is reliably fed with stud bolts one by one from said escapement unit and upon feeding of a stud bolt the driving device is driven while air is fed into the piston chamber so that the socket is rotated while being advanced to screw the stud bolt into intended work; a pneumatic pressure control unit for feeding compressed air produced by a compressor to said escapement unit and said impact wrench unit; and an electric control unit for driving and controlling said parts feeder of said parts feeder unit, said direction detector of said bolt orienting unit and said compressor of said pneumatic pressure control unit.

2. An apparatus for automatically feeding and setting stud bolts as set forth in claim 1, wherein said bolt orienting unit comprises a direction detector including a bobbin allowing a stud bolt having threaded portions of different lengths to axially pass therethrough, three coils disposed around the outer periphery of said bobbin, the end coils being wound in opposite directions, an oscillator connected to the central coil, and a stop for stopping a stud bolt at a fixed position in the bobbin, the arrangement being such that according to whether the voltage differential across the end coils is positive or negative, the direction of a stud bolt is determined.

* * * * *